US 8,400,159 B2

(12) United States Patent
Gao et al.

(10) Patent No.: US 8,400,159 B2
(45) Date of Patent: Mar. 19, 2013

(54) CASING CORRECTION IN NON-MAGNETIC CASING BY THE MEASUREMENT OF THE IMPEDANCE OF A TRANSMITTER OR RECEIVER

(75) Inventors: Guozhong Gao, El Cerrito, CA (US); Frank Morrison, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 275 days.

(21) Appl. No.: 12/405,214

(22) Filed: Mar. 16, 2009

(65) Prior Publication Data
US 2010/0097066 A1 Apr. 22, 2010

Related U.S. Application Data

(60) Provisional application No. 61/106,992, filed on Oct. 21, 2008.

(51) Int. Cl.
*G01V 3/18* (2006.01)
(52) U.S. Cl. .......... 324/339; 324/754.28; 324/519; 324/548; 324/686; 324/678; 324/750.17; 327/563; 327/337; 327/554; 73/579; 73/488; 73/504.16
(58) Field of Classification Search .......... 324/323–375; 327/563, 337, 554; 341/122–125, 172, 143, 341/118, 120; 73/597, 488, 504.16
See application file for complete search history.

(56) References Cited

U.S. PATENT DOCUMENTS

| | | | |
|---|---|---|---|
| 6,294,917 B1 * | 9/2001 | Nichols | 324/339 |
| 7,030,617 B2 * | 4/2006 | Conti | 324/339 |
| 7,481,274 B2 * | 1/2009 | Vinegar et al. | 166/302 |
| 2004/0140811 A1 | 7/2004 | Conti et al. | |
| 2009/0002763 A1 | 1/2009 | Sato | |
| 2009/0195244 A1 * | 8/2009 | Mouget et al. | 324/221 |
| 2009/0281731 A1 | 11/2009 | Morrison et al. | |

FOREIGN PATENT DOCUMENTS
WO WO 2007065667 A1 * 6/2007
* cited by examiner

*Primary Examiner* — Jermele M Hollington
*Assistant Examiner* — Son Le
(74) *Attorney, Agent, or Firm* — Darla P. Fonseca; Jeremy Berman

(57) ABSTRACT

Methods and related systems are described for determining the casing attenuation factor for various frequencies from measurements of the impedance of the transmitting or receiving coil of wire of. The compensation is based on two relationships. The first relationship is between one or more measured impedance parameters and the product of casing conductivity, casing thickness and electromagnetic frequency. The second relationship is between the casing correction factor and the product of casing conductivity, casing thickness and electromagnetic frequency.

32 Claims, 13 Drawing Sheets

CASING CORRECTION IN NON-MAGNETIC CASING BY THE MEASUREMENT OF THE IMPEDANCE OF A TRANSMITTER OR RECEIVER

CROSS REFERENCE TO RELATED APPLICATION

This patent application claims benefit of U.S. Provisional Patent Application Ser. No. 61/106,992, filed Oct. 21, 2008, which is incorporated by reference herein.

BACKGROUND

1. Field

This patent specification relates to electromagnetic measurements made in connection with boreholes. More particularly, this patent specification relates to methods and systems for correcting for or determining attenuation due to a conductive casing of a borehole while making electromagnetic measurements.

2. Background

Electromagnetic (EM) induction surveys are used to map the electrical conductivity of geologic formations between the boreholes and radially away from a single well. The latter, usually referred to as induction logging, has been in routine use for over fifty years. These surveys are performed in open holes, that is, holes that have not been lined with a conductive casing such as a metallic casing.

Recently, the concepts of induction logging have been extended to surveys between uncased wells and between wells which have conducting metallic liners. There is also interest in the use of logging between surface and downhole sensors and within single wells that are cased with metallic liners. The metallic liners (casing) introduce several problems for EM induction surveys. The first is that the signal from the transmitter to the receiver is severely attenuated in passing through the metallic casing because of its high conductivity and, usually, high magnetic permeability. The second is that the conductivity, permeability and thickness are variable along the length of the casing. A third problem is that the transmitters in these surveys are normally multi-turn solenoids that have a core of high magnetic permeability. At high current levels in the solenoid the permeability of the core material, and of the surrounding casing itself, is driven into a nonlinear regime. Under these circumstances the current in the solenoid is not proportional to the net radiated field. Receivers are also high-mu (high-$\mu$) cored solenoids but generally are not operated at high field levels where non linear effects are seen.

Induction surveys typically share the same physical principles. A transmitter, usually a multi-turn coil of wire, carries an alternating current of frequency $\omega$ (radians/sec) when placed in a wellbore. The current in the coil creates a time varying magnetic field in the surrounding subterranean formation which in turn, by Faraday's law, induces an electromotive force (emf). The emf drives currents in the formation, which are proportional to the formation conductivity. Finally a receiver is positioned either in the same wellbore as the transmitter or in another wellbore separated from the wellbore containing the transmitter. The receiver measures the magnetic field arising from the transmitter and the secondary, or induced, currents in the formation.

Conventional induction logging uses a combination of multiple receivers and/or multiple transmitters connected in series so as to cancel the mutual signal in air. In general, a theoretical model for such a system embedded in a formation of arbitrary resistivity is then used to match or interpret the received fields. In some applications, the absolute value of the average formation resistivity is not as important as the ability to map variations of resistivity within the formation. To determine this spatial variation of formation resistivity the surveys typically involve placing the transmitter at multiple positions (e.g. depths) in the wellbore and measuring the resulting field at multiple receiver positions for each transmitter position. In crosshole surveys, such a survey yields a data set similar to the methods of tomography.

There is a range of frequencies in which such induction surveys are practical. Below a certain frequency the secondary fields from the formation are simply too small to be detected with practical receivers and above a certain frequency the casing attenuation obliterates the formation response. The frequency range depends on the type of casing used. Carbon steel casing in general has a conductivity ($\sigma$) of 5e6 S/m, permeability ($\mu$) of 100, while Chromium casing is essentially non-magnetic ($\mu$=1), and has a conductivity ($\sigma$) of 1e6 S/m. As a result, Chromium casing is more favorable for induction surveys because Chromium attenuates the EM signal much less than the carbon steel casing at the same frequency. Thus, for practical field systems and depending on the conditions, in Chromium cased boreholes the range of practical frequencies may include up to several hundred Hz, while in carbon steel cased boreholes, the frequency may be limited to roughly 100 Hz. See e.g. G. Gao, D. Alumbaugh, P. Zhang, H. Zhang, C. Levesque, R. Rosthal, J. Liu, A. Abubakar, and T. Habashy, "Practical implications of nonlinear inversion for cross-well electromagnetic data collected in cased-wells," SEG extended abstract, 2008, hereinafter referred to as "G. Gao, 2008" and which is hereby incorporated by reference herein.

A problem is that within the frequency range described above, the casing properties (conductivity ($\sigma$), permeability ($\mu$, for Chromium casing $\mu$ is roughly 1), thickness (t) and inner radius (r)) are not constant along the length of casing. Since the casing attenuation is so strong, small variations in its properties produce variations in the fields seen by a receiver that are large compared to the variations expected from desired formation variations. A further problem is that the strength of the transmitter, known as the transmitter moment, must be known so that moment variations are not misinterpreted as variations in the formation conductivity.

It is therefore highly desirable to provide a means to eliminate, or correct for, these casing variations. As shown in G. Gao, 2008, removing the casing effects from the measurements posts significant benefits on the image quality of the EM inversion/imaging. Consider the schematic for a cross-well survey shown in FIG. 1a. Boreholes 110 and 112 are shown in formation 100. Both boreholes are cased with a conductive liner such as high-carbon steel. The transmitter $T_i$, reference number 120, at location i in borehole 110, produces at field $B_{ij}$ at receiver 122 at location j of borehole 112. The field $B_{ij}$ can be expressed as the product of:

$$B_{ij}=M_i g_{ij} K_{ij}^f k_j k_i = G_{ij} K_{ij}^f k_j k_i \qquad (1)$$

where the moment (or strength), $M_i$ of the transmitter 120 and a purely geometric term, $g_{ij}$, are combined here into $G_{ij}$; the desired formation response, the response of the induced currents, if no casing was present; $K^f_{ij}$, is the casing attenuation at the transmitter $k_i$; and the casing attenuation at the receiver 124 at location j of borehole 112, $k_j$.

Augustin, A. M., Kennedy, W. D., Morrison, H. F., and Lee, K. H., A theoretical study of surface to borehole electromagnetic logging in cased holes: Geophysics, 54, 90-99 (1989), hereafter referred to as "Augustin et al (1989)," and incorporated by reference herein, shows that the casing attenuation terms $k_i$ and $k_j$ are multiplicative for simple transmitters and receivers operating in homogeneous casing.

One known solution to the casing attenuation problem is to use ratios of received fields to eliminate $k_i$ and $k_j$. As an illustrative example of this method, suppose the receiver borehole is not cased so that $k_j$ is one. Now for a fixed position of the transmitter, we can take the ratio of fields at two different receiver positions A & B $$\frac{B_{ij}(A)}{B_{ij}(B)} = \frac{G_{ij}(A)K_{ij}^f(A)k_i}{G_{ij}(B)K_{ij}^f(B)k_i} \qquad (2)$$

and the casing attenuation $k_i$ cancels out. The $G_{ij}$'s are known so the full ratio yields a formation response ratio that is casing independent. Such response ratios can be fitted to models of the formation just as are the responses themselves. Commonly owned U.S. Pat. No. 6,294,917, herein after "the '917 patent" and incorporated by reference herein, describes how the ratio method can easily be extended to double ratios if both boreholes are cased.

As shown in G. Gao 2008: (1) the ratios described above are relatively sensitive to noise in the measured fields; and (2) in the modeling, or inversion, process the use of ratio data reduces the sensitivity of the method to variation in formation resistivity near the boreholes. In the example shown in FIG. 1a, this area of reduced sensitivity would occur near the transmitter borehole 110.

An alternative solution to the ratio approach is described in WO 2009/002763A1 (US 20090005993). The alternative solution, referred to herein as the "inversion" method reduces the effects of noise by inverting the casing attenuation factors and formation property simultaneously. However, as shown in G. Gao 2008, the inversion method approach also reduces the sensitivity to variation in formation resistivity near the boreholes, which reduces the resolution of the resistivity/conductivity image obtained by EM inversion/imaging.

Still another known solution, at least for the cross-borehole mode of operation, is to place an auxiliary receiver adjacent to the transmitter (or auxiliary transmitter adjacent to the receiver). This method is described in commonly owned U.S. Pat. No. 7,030,617, hereinafter referred to as "the '617 patent," and incorporated by reference herein.

Consider FIG. 1b for the case where the object is to solve for the casing correction for the transmitter 120 in cased borehole 110 when a receiver $R_j$, 122, is in an open-hole borehole 114.

The field $B_k$ at an auxiliary receiver $R_k$, 130, is effectively governed by the equation:

$$B_{ik} = G_{ik}k_ik_k \qquad (3)$$

because the spacing between the transmitter 120 and auxiliary receiver 130 is too small for there to be any meaningful formation response.

The field at the distant receiver 122 is governed by the equation:

$$B_{ij} = G_{ij}K_{ij}^f k_i \qquad (4)$$

If the auxiliary receiver, $R_k$, 130 is sufficiently far from the transmitter 120 and if each has the same coupling to the casing of borehole 110 (same length of solenoid, same core and winding configuration) and if the casing is uniform along its length, then $k_i = k_k$ and so:

$$B_{ik} = G_{ik}k_i^2 \qquad (5)$$

or $$k_i = \sqrt{\frac{B_{ik}}{G_{ik}}} \qquad (6)$$

Then $$B_{ij} = G_{ij}K_{ij}^f \cdot \sqrt{\frac{B_{ik}}{G_{ik}}}$$

and this is easily solved for the desired formation response $K_{ij}^f$.

If, however the transmitter 120 is too close to the receiver 122 so that separability is no longer the case; (2) if the variations in casing properties occur on a scale small relative to the spacing of the transmitter 120 and auxiliary receiver 130; (3) in some cases where it is impractical to make the auxiliary receiver 130 electrically equivalent to the transmitter; or (4) if the transmitter 130 is operating in a non-linear region, the results from the method of the '617 will be less accurate compared to other methods.

Another method combining auxiliary receiver-transmitters with the ratio method has been described in U.S. Patent Application Publication No. 2009/0091328 (U.S. patent application Ser. No. 11/868,379, filed on Oct. 5, 2007), hereinafter "the '379 application," and incorporated by reference herein. The method described in the '379 application uses an auxiliary transmitter and receiver as shown in FIG. 2. In this case the receiver 222, $R_j$ can also be used as a transmitter to the receiver at location k. The field at $R_j$ from the main transmitter 220, $T_i$ at location i, is given by $$B_{ij} = G_{ij}k_ik_j \qquad (7)$$

and the field at receiver 224 at location k, $B_{ik}$ is given by $$B_{ik} = G_{ik}k_ik_k \qquad (8)$$

The field at location k due to transmitter/receiver 222 at j is given by $$B_{jk} = G_{jk}k_jk_k \qquad (9)$$

Since all the Bs and Gs are known, there are three equations in three unknowns: $k_i$, $k_j$ and $k_k$. It is possible to solve for $k_i$ since the field at the distant site (shown as a coil 230 at location A), is given by:

$$B_{iA} = G_{iA}k_{iA}^f K_i \qquad (10)$$

With $k_i$ known, the required $K_{iA}^f$ can also be determined.

The latter multiple auxiliary system is straight-forward in concept but is relatively complicated to implement in a practical system because the instrument actually lowered into the borehole 210 is long and heavy. The latter multiple auxiliary system does have the advantage that nonlinear effects at the transmitter are included in $k_i$.

Thus it is desirable to use measurements on the solenoid itself to predict the casing attenuation factor at the solenoid. One recent development is described in commonly owned U.S. Pat. No. 8,326,539 (U.S. patent application Ser. No. 12/117,089, filed May 8, 2008) hereinafter referred to as "the '089 application," and incorporated herein by reference. The '089 application describes the use of measurements of the impedance of the transmitting or receiving coil to determine the casing attenuation factor of the casing around the coil. The casing parameters (conductivity, magnetic permeability, and casing thickness) and the casing attenuation factors can be determined from the impedance measurements of at least two frequencies (from a pre-calculated table), then the determined casing parameters can be used to calculate the casing attenuation factors. Alternatively, a table between the impedance and casing attenuation factors can be directly established. However, the '089 application does not include any approach for determining the casing parameters such as conductivity, magnetic permeability, and casing thickness from the impedance measurements. It is well known that the casing parameters are typically coupled together in a complicated way and the coupling varies significantly with the casing parameters and the frequency, which makes it challenging to separately determine the casing parameters without additional constraints.

Thus it is desirable to provide a more robust method of using measurements on a solenoid to predict the casing attenuation factor as well as other casing parameters at the location of the solenoid.

SUMMARY

According to embodiments, a method for making an electromagnetic induction survey of a formation surrounding a borehole having a casing is provided. An electromagnetic transducer is deployed into a section of the borehole that is cased with a conductive non-magnetic casing. As used herein the term "non-magnetic" means the magnetic permeability is close to or equal to one. Impedance measurements relating to impedance of the electromagnetic transducer at a first frequency are made while deployed in the section of the borehole. Electromagnetic survey measurements are made of the formation. Attenuation in the electromagnetic survey measurements due to the conductive non-magnetic casing is compensated for with the compensation is based at least in part on a relationship between a casing correction factor and a product of parameters relating to at least one of casing conductivity, casing thickness and electromagnetic frequency.

Additionally, according to other embodiments the compensation is based at least in part on a relationship between a casing correction factor and parameters relating to impedance, where the relationship is preferably derived in part from a relationship between a casing correction factor and a product of parameters relating to casing conductivity, casing thickness and electromagnetic frequency.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

This description relates to the field of cross-borehole logging, surface-to-borehole, borehole-to-surface logging, or in-hole logging by electromagnetic means when the holes are cased with non-magnetic/chromium casing. In any such cases with a conductive casing, it is highly desirable to eliminate, or correct for, the variable attenuation of fields transmitted through, or received through, casing which has inherent variations in conductivity, magnetic permeability and/or thickness. According to some embodiments, a method by which measurement of the impedance of a transmitting (or receiving) solenoid at a frequency can be used to predict the attenuation of the field by the surrounding casing as seen at a distant receiver (or from a distant transmitter) for any frequency, irrespective of conductivity and thickness for casing with a given inner diameter, as well as the formation material conductivity. The formation material conductivity is additionally employed to predict the attenuation of the field by the casing. According to other embodiments, a method to predict the casing attenuation invariant with small changes in casing inner diameter is provided.

According to some embodiments, a novel means is provided for determining the casing attenuation factor for any frequency from measurements of the impedance of the transmitting or receiving coil of wire of a frequency irrespective of conductivity and thickness of the casing. In other words, if the impedance for a particular frequency is known, the casing attenuation factor for any frequency and for any casing can be obtained. The accuracy of the estimated casing attenuation factor depends on how accurately the impedance is measured.

Figure 1A:
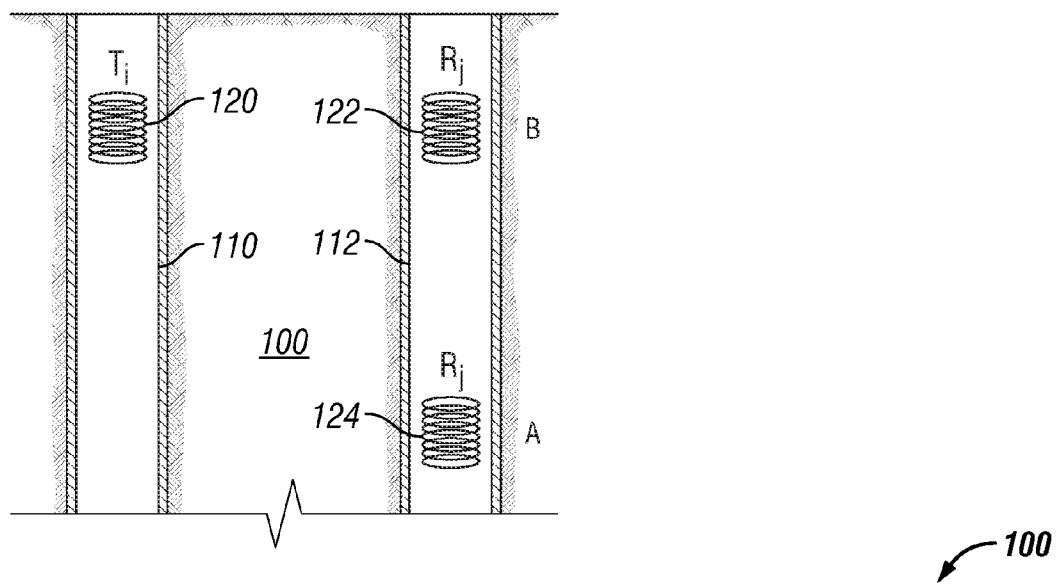
FIGS. 1a-b show crosswell electromagnetic surveys as is known in the art.
Figure 1B:
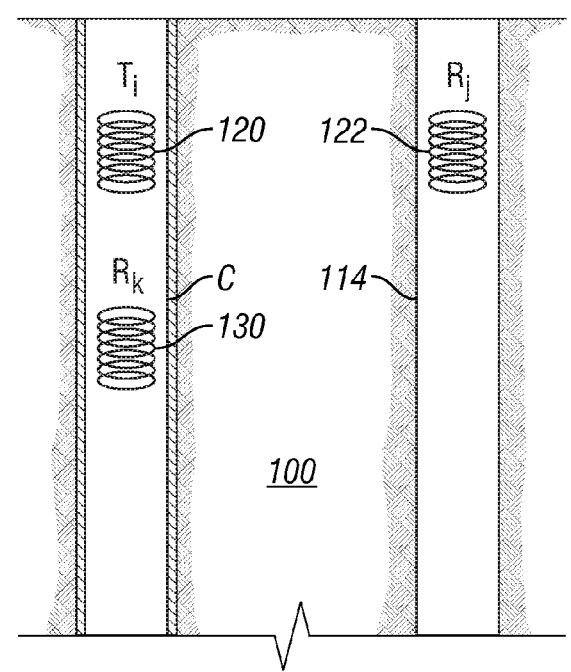
Figure 2:
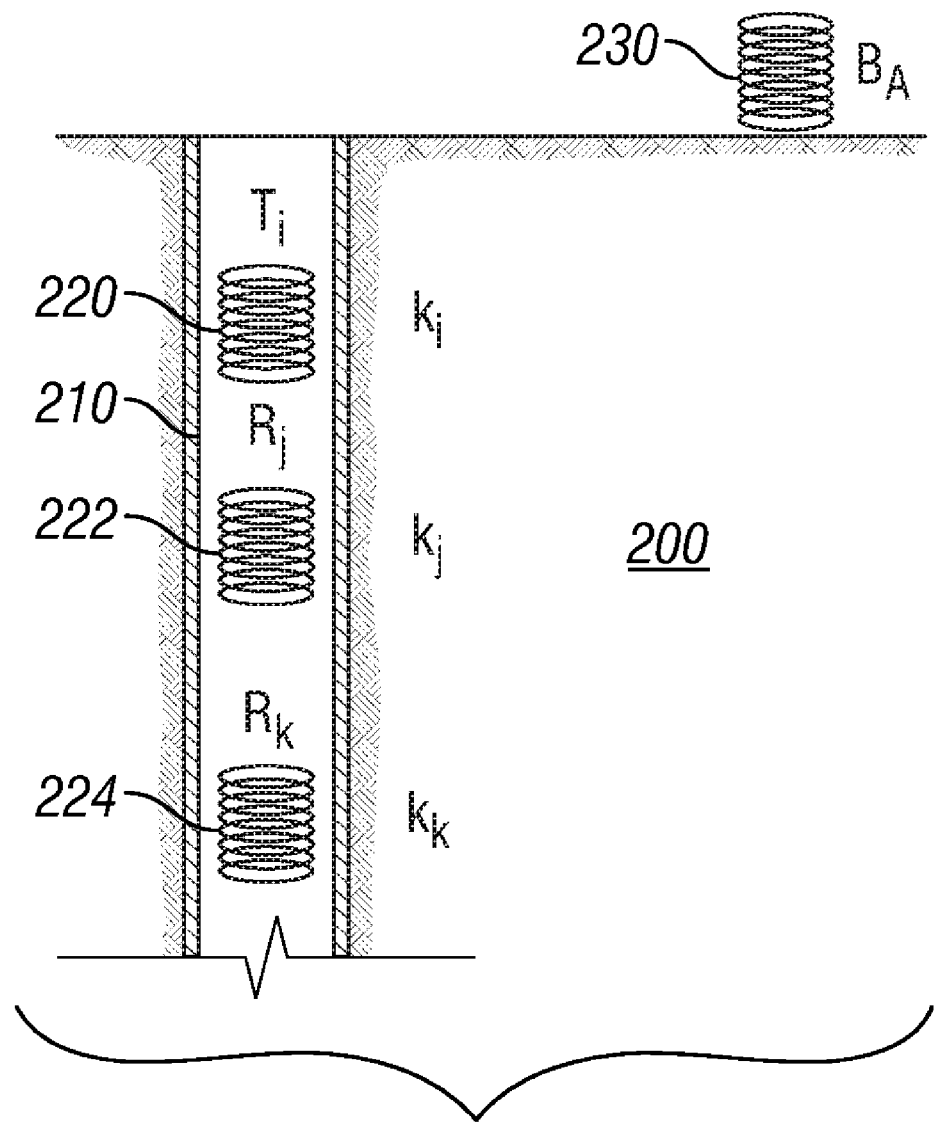
FIG. 2 shows an auxiliary receiver-transmitter arrangement for use in known ratio methods for casing compensation.
Figure 3:
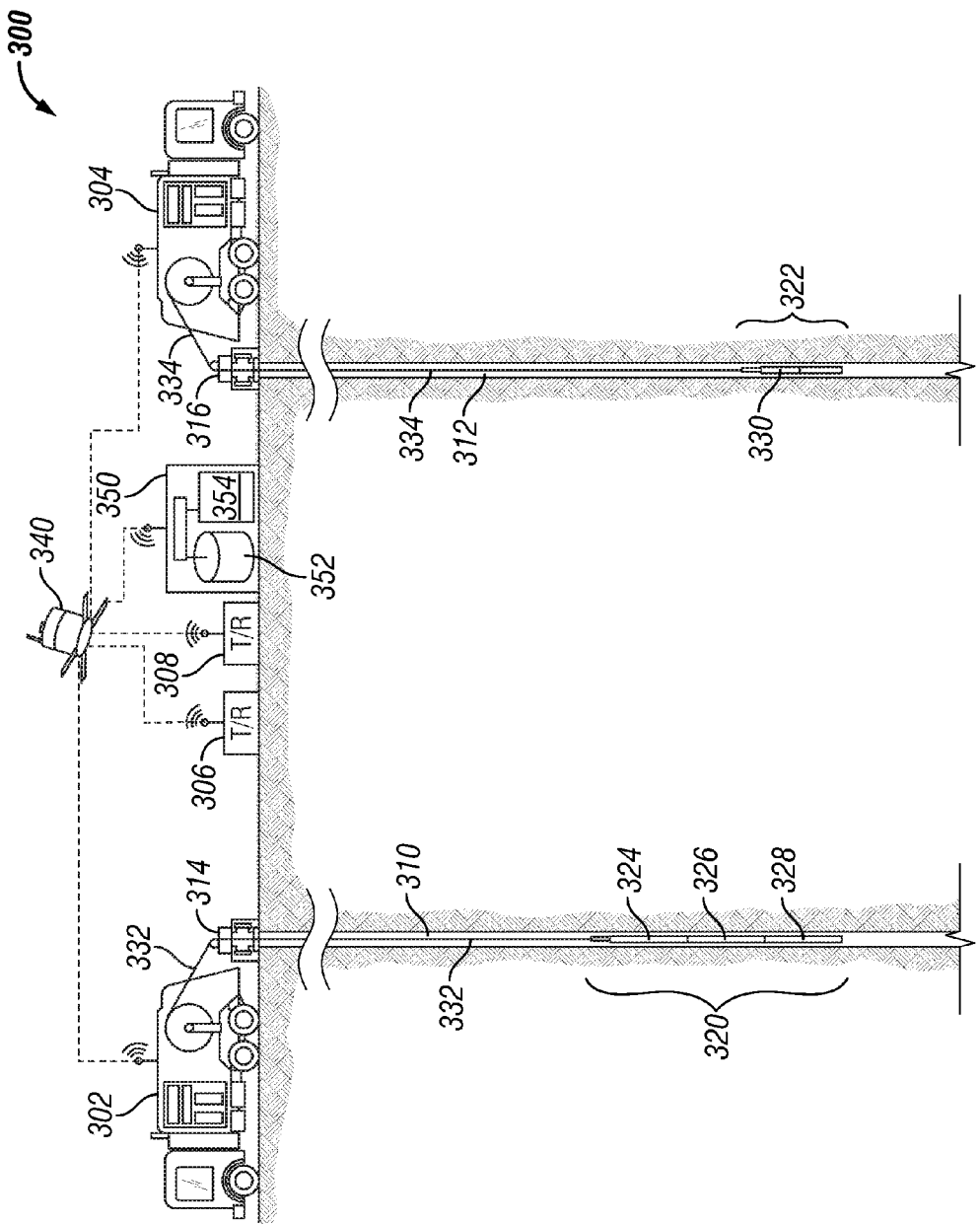
FIG. 3 is a schematic showing an electromagnetic induction survey system in accordance with embodiments of the invention.

FIG. 3 is a schematic showing an electromagnetic induction survey system in accordance with embodiments of the invention. Boreholes 310 and 312 are in subterranean formation 300. Wireline toolstring 320 is deployed in borehole 310 from wireline truck 302 using cable 332 via wellhead 314. Similarly, wireline toolstring 322 is deployed in borehole 312 from wireline truck 304 using cable 334 via wellhead 316. Trucks 302 and 304 communicate with each other and/or other surface components and systems via communication with satellite 340 or other known wireless or wired means. Tool 320 includes several components, such as receivers 324, 326 and 328. Tool 322 includes transmitter 330. According to some embodiments, surface transmitters and/or receivers 306 and 308 are used instead of, or in addition to either of the downhole tools when performing surface-to-borehole or borehole-to-surface electromagnetic induction surveys. According to some embodiments, processing system 350 is used to process the measured data. System 350 includes one or more processors 354 and a storage system 352 that can include various types of storage including volatile memory such as primary random access memory, and non-volatile memory such as read-only memory, flash memory, magnetic computer storage devices such as hard disks, floppy disks, and magnetic tape, and optical discs such as CD ROMS, DVD ROMS.

The impedance of the coils, the ratio of the drive voltage (V) to the current (I) that flows through the coil is the sum of its resistance (R) and inductive reactance $$L\frac{dI}{dt}$$

where L is its self-inductance. In phasor format, the impedance Z is expressed as follows:

$$Z=R+i\omega L \quad (11)$$

where $\omega=2\pi f$ is the angular frequency, and f is the frequency in Hz.

In contrast to methods described in the '089 application, according to some embodiments equation (2) is transformed into the following form by dividing won both sides of equation (11), $$Z/\omega=R/\omega+iL \quad (12)$$

Embodiments disclosed herein relate to using $R/\omega$ and/or L to determine the casing attenuation factors. Importantly, it has been found that $R/\omega$ is a much more physically significant parameter than R alone. The use of $R/\omega$ is significant because the parameter of resistance over angular frequency enables the methods described herein. $R/\omega$ has the same units as L. Because $\omega=2\pi f$, in the following sections of the description the term R/f is simply used instead of $R/\omega$.

In practice, transmitters or receivers as shown in FIG. 3 are each a long solenoid wrapped around a magnetically permeable core. The inductance and resistance of such a coil can be calculated with a permeable core, without a permeable core, and with casing, and without casing. When such a coil is inserted in a conductive casing, the induced currents in the casing produce a secondary field which threads the coil and induces what is known as a back emf. The back emf is phase-shifted with respect to the drive voltage: the in-phase component adds resistance (R) to the coil and the out-of-phase component changes the inductance (L) of the coil. Thus the coil impedance is changed by the coupling to the casing and the changes are dependant on the properties of the casing.

Mu-metal cored coils are typically necessary, because with mu-metal core, the coupling between the solenoid and the casing is greatly enhanced and that, correspondingly, the sensitivity of the measurements to the casing parameters is much higher.

Figure 4A:
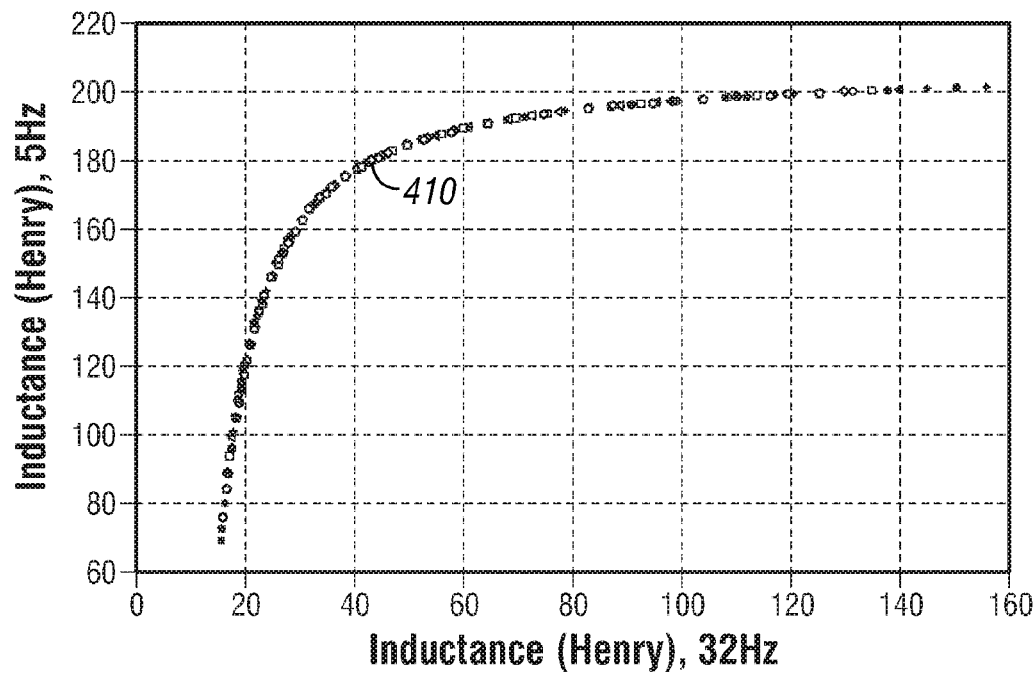
FIGS. 4a and 4b are cross plots showing the inductance (L) and resistance (R) at 5 Hz versus the inductance and resistance at 32 Hz for varying $\sigma$ and t of the casing.
Figure 4B:
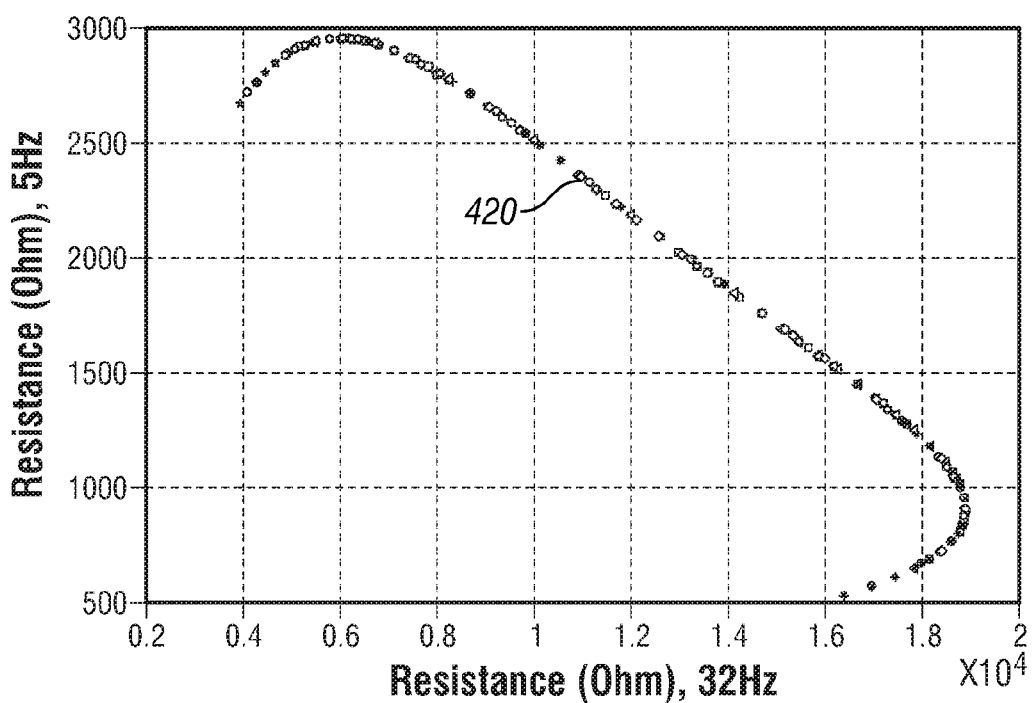
Figure 5A:
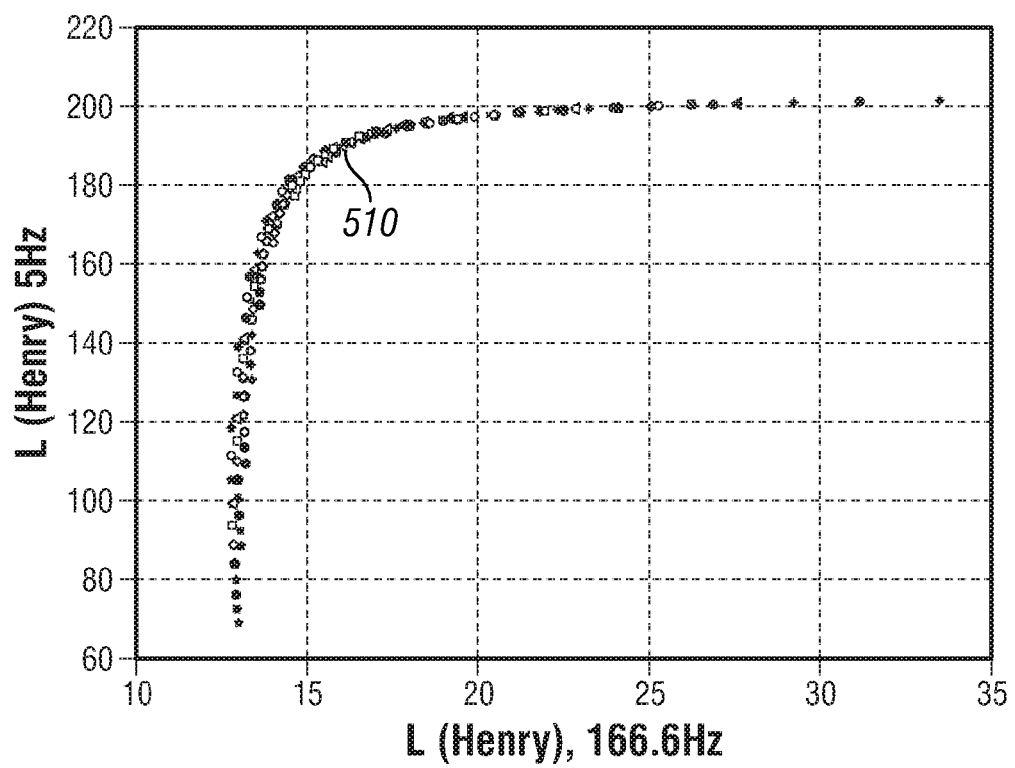
FIGS. 5a and 5b are cross plots showing the inductance (L) and resistance (R) at 5 Hz versus the inductance and resistance at 167 Hz for varying $\sigma$ and t of the casing.
Figure 5B:
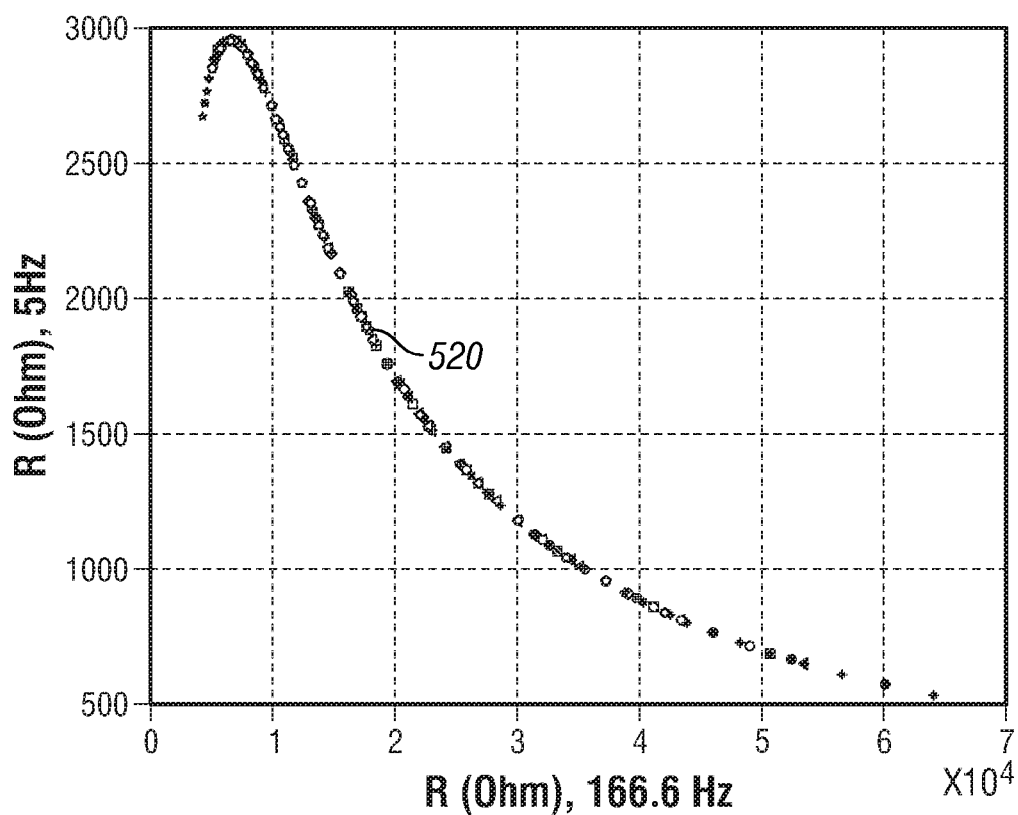

There are significant and practical measurable changes in L and R of the transmitter coil for relatively small changes in conductivity ($\sigma$), magnetic permeability ($\mu$) and thickness (t) of the casing for frequencies between 1 and 250 Hz. For the following examples, we focus on nonmagnetic/chromium casing which assume the magnetic permeability of the casing is constant and equal to 1. The inner diameter of the casing is fixed. FIGS. 4a and 4b are cross plots showing the inductance and resistance at 5 Hz versus those at 32 Hz for varying $\sigma$ and t of the casing. In particular, curve 410 of FIG. 4a shows the inductance (L) at 5 Hz versus 32 Hz for varying $\sigma$ and t, and curve 420 of FIG. 4b shows the resistance (R) at 5 Hz versus 32 Hz for varying $\sigma$ and t. FIGS. 5a and 5b are cross plots showing the inductance (L) and resistance (R) at 5 Hz versus those at 166.6 Hz for varying $\sigma$ and t of the casing. In particular, curve 510 of FIG. 5a shows the inductance (L) at 5 Hz versus 166.6 Hz for varying $\sigma$ and t, and curve 520 of FIG. 5b shows the resistance (R) at 5 Hz versus 166.6 Hz for varying $\sigma$ and t. For FIGS. 4a, 4b, 5a and 5b, the range of $\sigma$ is between 5e5 and 5e6 S/m, the range of t is between 0.25 in and 0.45 in, and the range of f is between 5 Hz and 250 Hz. Several observations can be made from FIGS. 4a, 4b, 5a and 5b. First, relationships for L and R at different frequencies are completely dependent. In other words, if we know L and R at 5 Hz, L and R at other frequencies can be well derived from those of 5 Hz. Second, knowing L and R for more than one frequencies will not add any more information than those of one frequency. Finally, the conductivity $\sigma$ and casing thickness t are not separable.

Thus, an important finding obtained from FIGS. 4a, 4b, 5a and 5b is that conductivity $\sigma$, casing thickness t and frequency f are not separable. A question which then arises is how we can determine $\sigma$ and t from impedance measurements? The answer is that such a determination cannot be made because they are not separable.

Figure 6A:
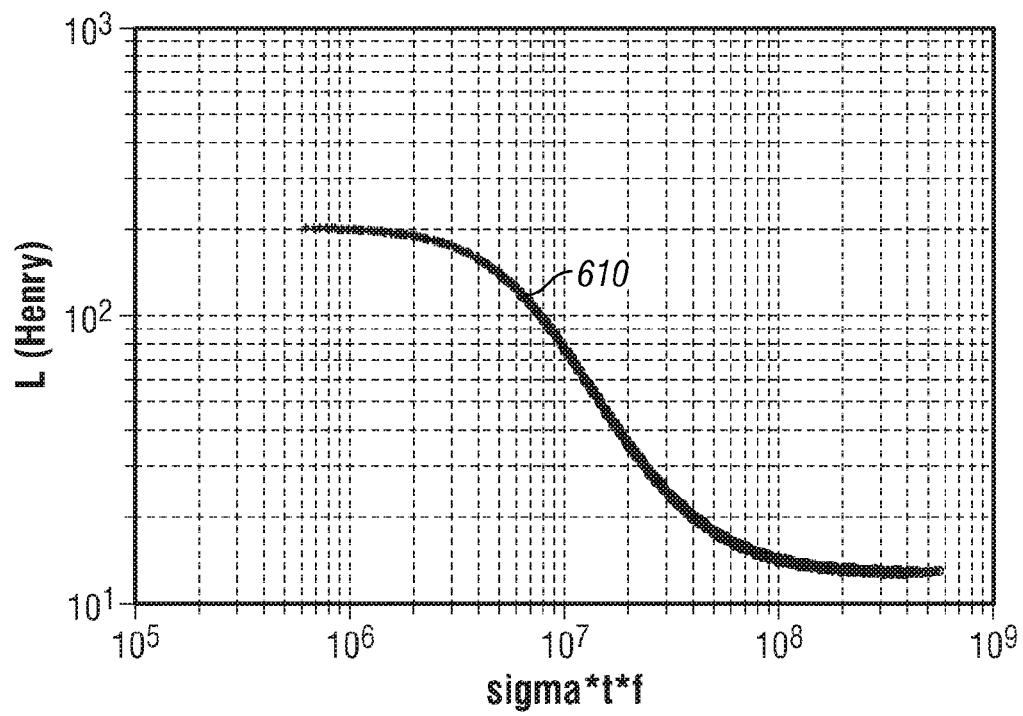
FIG. 6a is a plot showing the relationship between inductance and the product of casing conductivity, casing thickness and frequency.
Figure 6B:
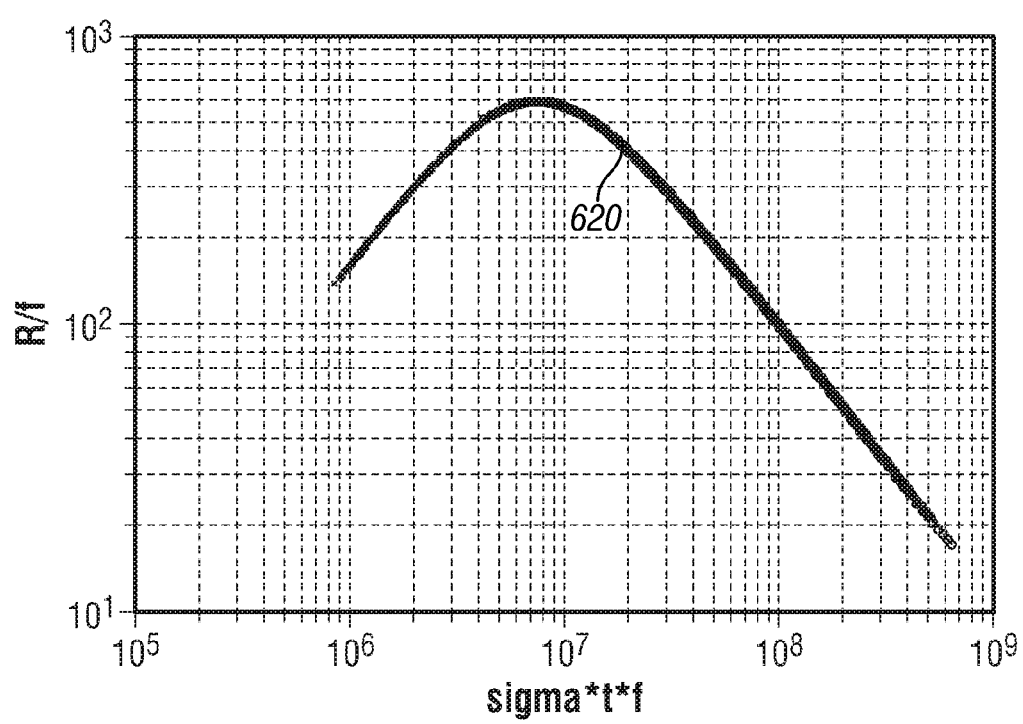
FIG. 6b is a plot showing the relationship between resistance over frequency and the product of casing conductivity, casing thickness and frequency.
Figure 7A:
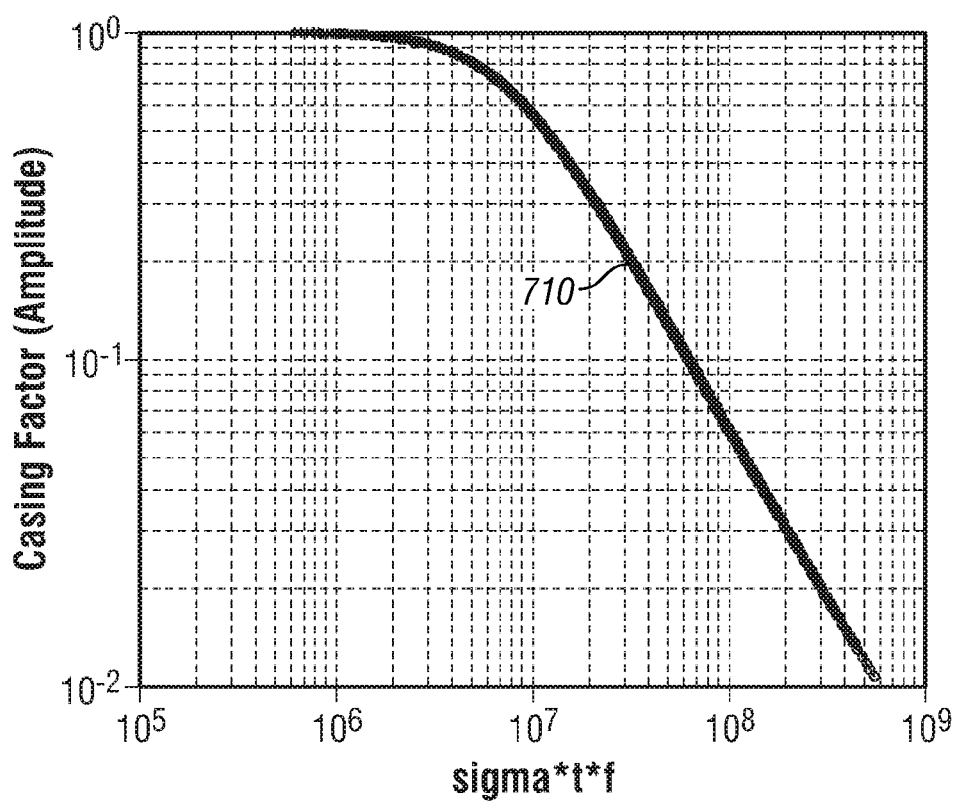
FIGS. 7a and 7b show the relationship between the casing attenuation factor and the product of casing conductivity, casing thickness and frequency.
Figure 7B:
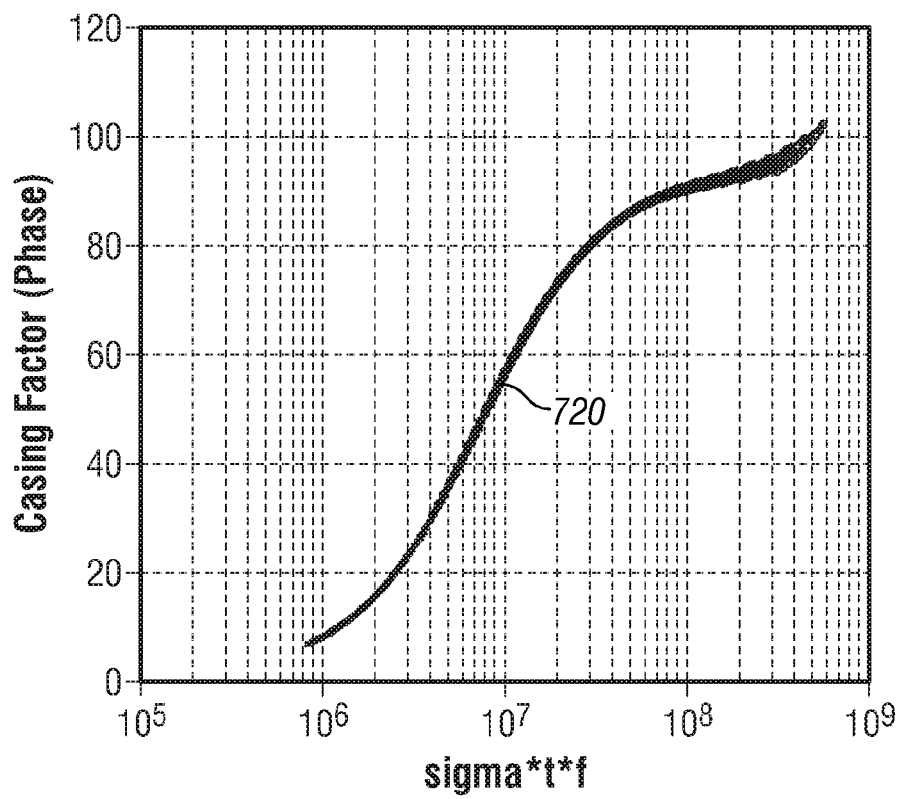

However, we have found that if we plot L and R/f versus the product of conductivity $\sigma$, casing thickness t and frequency f namely $\sigma \cdot t \cdot f$, for all the conductivity, casing thickness and frequencies, the problem becomes unexpectedly and surprisingly simple to solve. FIG. 6a is a plot showing the relationship curve 610 between inductance (L) and the product of casing conductivity ($\sigma$), casing thickness (t) and frequency (f). FIG. 6b is a plot showing the relationship curve 620 between resistance over frequency (R/f) and the product of casing conductivity ($\sigma$), casing thickness (t) and frequency (f). In addition, an unexpected simple relationship has been found to exists between the casing attenuation factor and $\sigma \cdot t \cdot f$. FIGS. 7a and 7b show the relationship between the casing attenuation factor and $\sigma \cdot t \cdot f$. In particular, curve 710 in FIG. 7a shows the relationship between the casing factor amplitude and $\sigma \cdot t \cdot f$, and curve 720 in FIG. 7b shows the relationship between the casing factor phase and σ·t·f. An inner casing diameter of 6.4 inches was used for both curves 710 and 720. For FIGS. 6a, 6b, 7a and 7b, the range of σ is between 5e5 and 5e6 S/m, the range of t is between 0.25 in and 0.45 in, and the range of f is between 5 Hz and 250 Hz.

Shown in FIGS. 6a and 6b, it can be clearly seen that, both L and R/f are simple functions of sigma*t*f. L changes monotonically with sigma*t*f, which means sigma*t*f can be uniquely determined if L is known. R/f does not change monotonically with sigma*t*f, there are two sigma*t*fs which correspond to the same R/f. However, for a particular tool configuration, the frequency that corresponds to the peak is known. As a result, if the frequency of interest is bigger than that peak frequency, the curve on the right-hand side of the peak should be used, otherwise, the curve on the left-hand side of the peak should be used. Thus, it has been found that sigma*t*f can be easily determined from either L or R/f or Z/f.

Shown in FIGS. 7a and 7b, the casing attenuation factor has a simple relationship with sigma*t*f as well. If sigma*t*f is known, the casing attenuation factor can be uniquely determined using curves 710 and 720 of FIGS. 7a and 7b respectively.

Figure 8A:
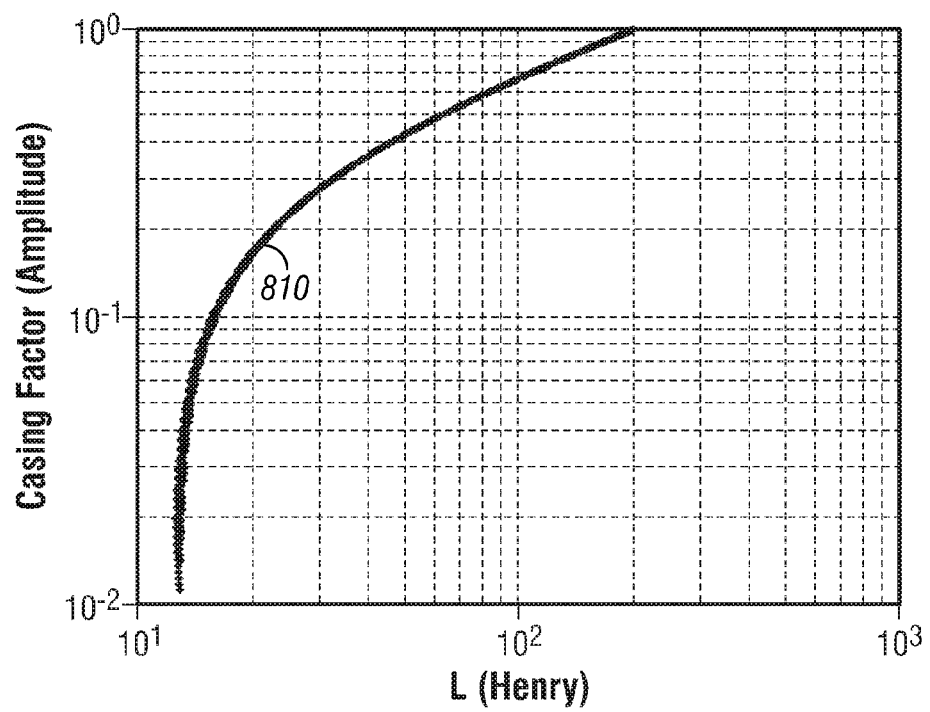
FIGS. 8a-8d are plots of the relationship for casing attenuation factor versus L and R/f.
Figure 8B:
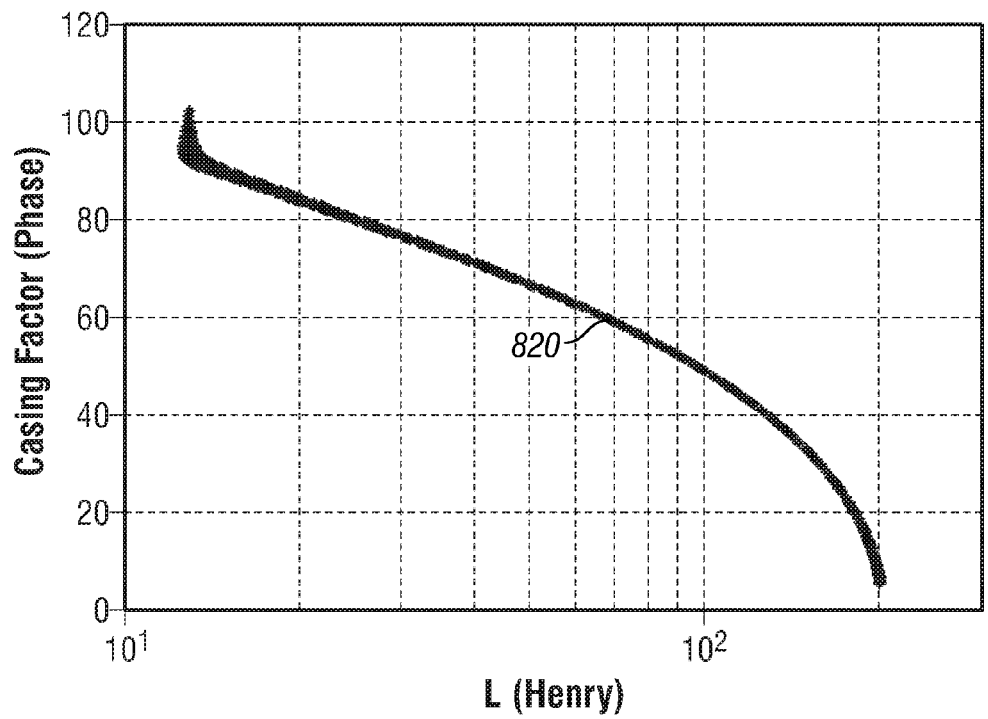
Figure 8C:
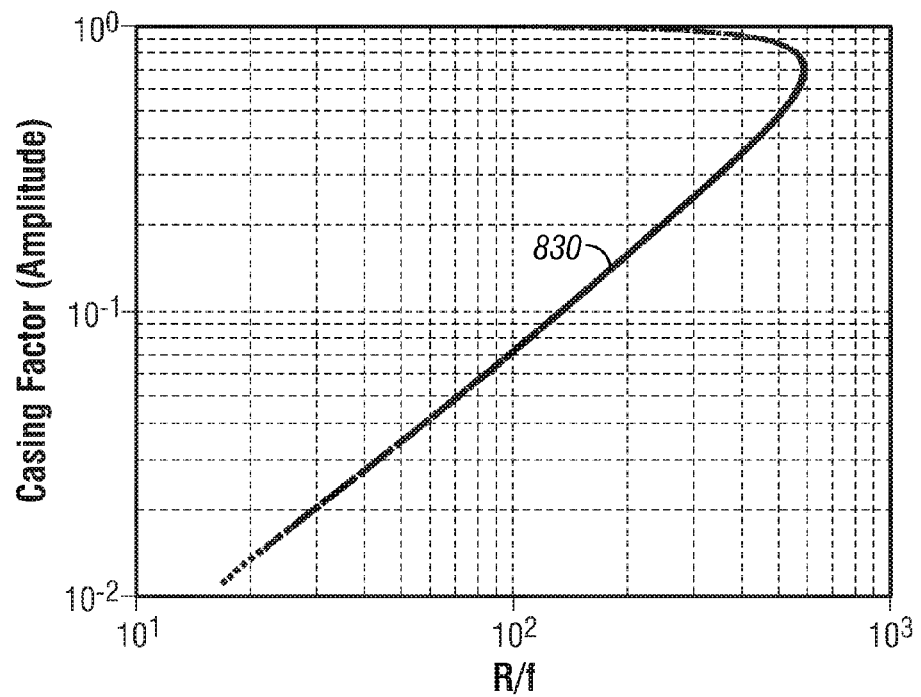
Figure 8D:
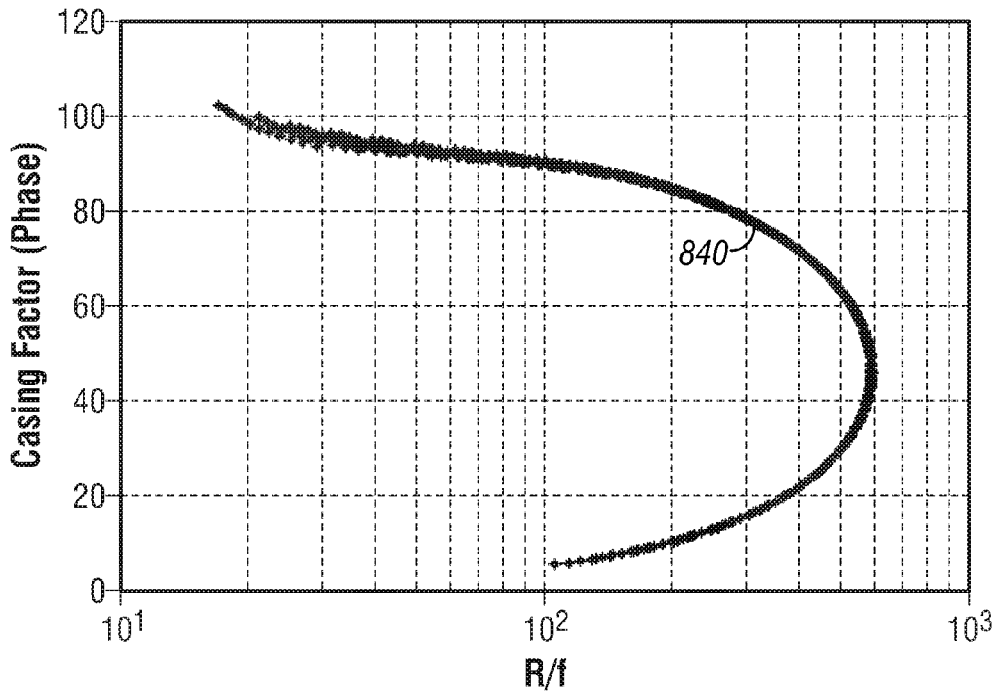

Because L, R/f and the casing attenuation factor are simple functions of sigma*t*f, relationship between L, R/f and the casing attenuation factor can be established directly. FIGS. 8a-8d are plots giving the relationship for casing attenuation factor versus L and R/f. In particular, curve 810 in FIG. 8a shows casing attenuation factor amplitude versus L; curve 820 in FIG. 8b shows casing attenuation factor phase versus L; curve 830 in FIG. 8c shows casing attenuation factor amplitude versus R/f; and curve 840 in FIG. 8d shows casing attenuation factor phase versus R/f. An inner casing diameter of 6.4 inches was used for curves 810, 820, 830 and 840. Notice that the casing factor does not change monotonically with R/f, however, the curves can be easily used by comparing to the peak frequency.

Additionally, notice that all the plots in FIGS. 8a-d will not change with the frequency, casing conductivity and thickness. The relationships shown have been confirmed by both numerical modeling and lab measurements. FIGS. 6, 7 and 8 are only a function of the tool configuration and the casing inner diameter, which means FIGS. 6, 7, 8 can be prepared beforehand for all the tool configurations and casing inner diameters either from numerical modeling or lab measurements, then casing-correction can be done in real-time with the acquisition or easily in the office.

According to some embodiments, a method will now be described for determining the casing correction in cases where the casing inner diameter is known.

In this example the casing diameter is known, and suppose that the impedance at frequency $f_1$ is measured, the casing attenuation at frequency $f_2$ needs to be determined for any casing; the following steps can be used:

(1) If $f_2=f_1$, then FIGS. 8a-d can be used to determine the casing attenuation factor either by L or R/f or both. Note that it is preferable to use R/f at high frequencies, because at high frequencies, the relationship between the phase of the casing factor and L becomes less well defined. It has been found that most of the time, the amplitude of Z/f is a better choice than either R/f or L.

Note that a two-step approach can also be used: use FIGS. 6a-b to determine sigma*t*f by L or R/f or both, then use FIGS. 7a-b to determine the casing attenuation factor from estimated sigma*t*f.

(2) If $f_2$ is not equal to $f_1$, FIGS. 6a-b can be used to determine sigma*t*$f_1$. Then, Sigma*t*$f_2$ can be obtained by simple frequency scaling as follows $$\text{Sigma}*t*f_2 = (\text{sigma}*t*f_1)*f_2/f_1 \tag{13}$$

FIGS. 7a-b can then be used to determine the casing attenuation factor associated with sigma*t*$f_2$. Or the impedance can be first obtained using FIGS. 6a-b and sigma*t*$f_2$, then use FIGS. 8a-d to determine the casing attenuation factor.

The casing attenuation factor estimation method described above is robust in cases where a robust measurement of the impedance can be made. According to some embodiments, only one of the two parameters (R/f, or L) is used to estimate the casing factors, the selection depending on which one is measured more accurately. As a result, the amplitude of Z/f can be also used to estimate the casing factors instead of using only one of them.

Notice that: (1) all the figures presented here can be used as a lookup table for data interpolation or all the figures can be first fit to formulas, then the required results can be obtained from direct formula calculation; and (2) all the figures can be obtained either from numerical modeling or lab measurements as long as the coil geometry and properties are defined. Electromagnetic modeling code such as finite element and/or finite difference analysis software can be used. Examples of commercially available numerical modeling software packages that are suitable for generating the relationships include: MagNet finite element analysis simulation software from Infolytica Corporation, and Comsol Multiphysics® software from Comsol AB.

The method described above has been found to be effective if the casing inner diameter (ID) is known. However, the casing inner diameter may exhibit variations along the survey interval. According to some other embodiments, a method will now be described for determining the casing correction where there may be variations in the casing inner diameter.

Figure 9A:
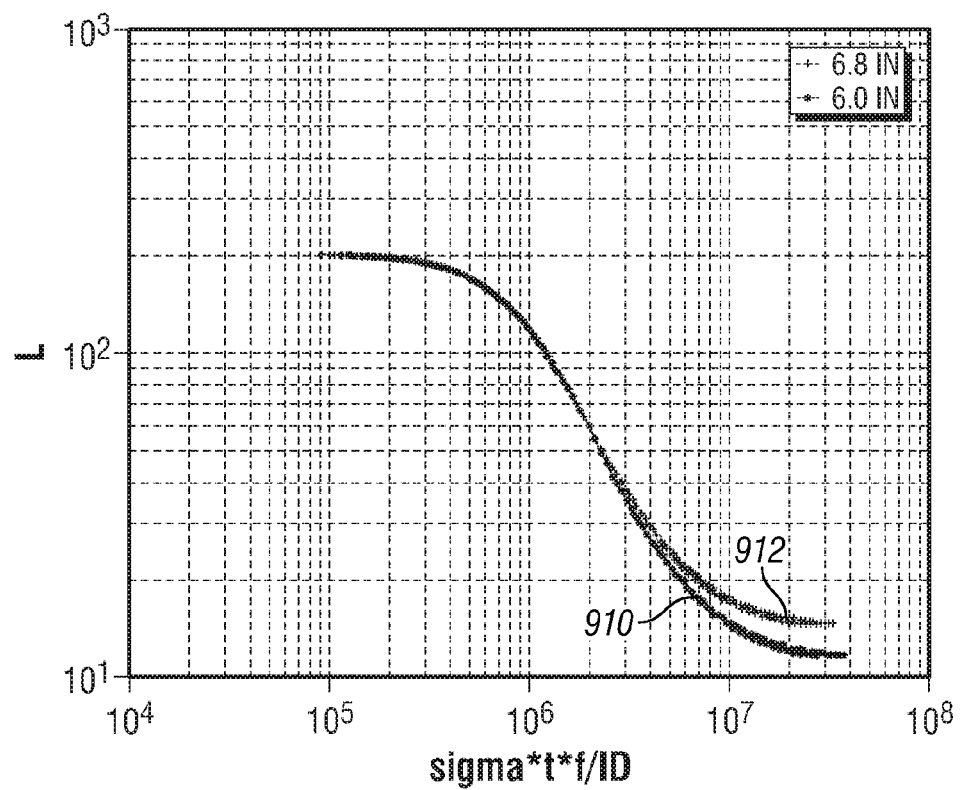
FIGS. 9a and 9b are plots of the relationship for L and R/f versus sigma*t*f/ID.
Figure 9B:
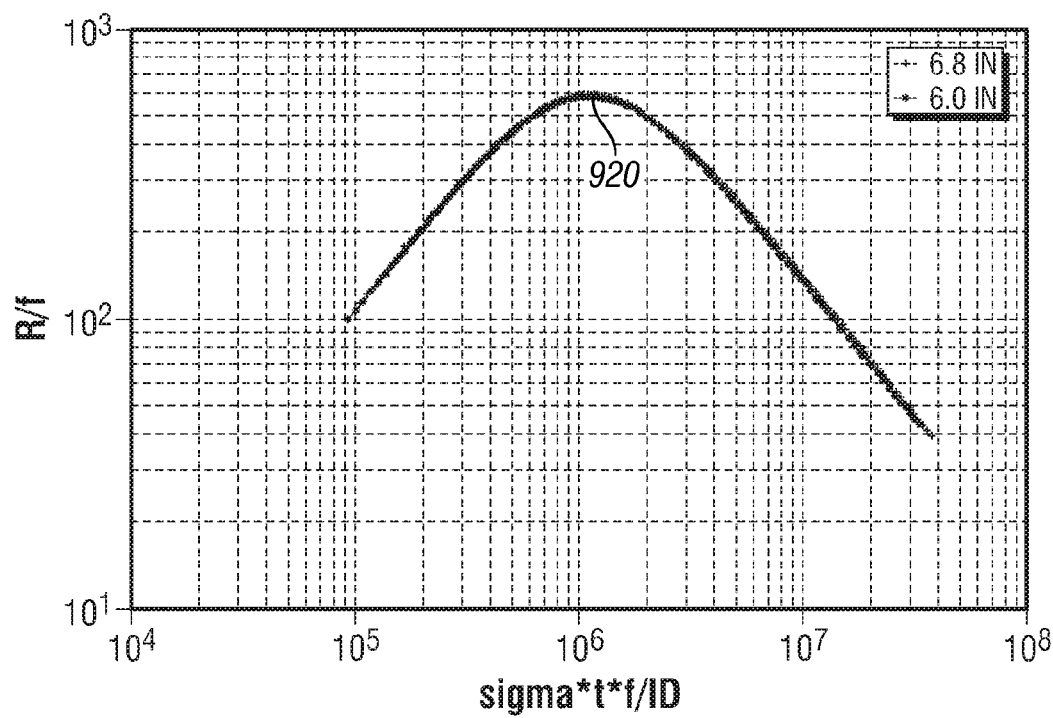

To develop such a method, we have established that a relationship between (R/f) and L and sigma*t*f/ID, instead of sigma*t*f can be developed. FIGS. 9a and 9b are plots showing the relationship for L and R/f versus sigma*t*f/ID. In particular, curves 910 and 912 in FIG. 9a shows the relationship of L versus sigma*t*f/ID for casing inner diameters 6.0 inches and 6.8 inches respectively. Curve 920 in FIG. 9b shows the relationship of R/f versus sigma*t*f/ID for both casing inner diameters, 6.0 inches and 6.8 inches. As shown in FIG. 9b, the relationship of R/f versus sigma*t*f/ID changes very little with small variations in the casing inner diameter while FIG. 9a shows that the relation for L versus sigma*t*f/ID does change with small variations in the casing inner diameter.

Figure 10A:
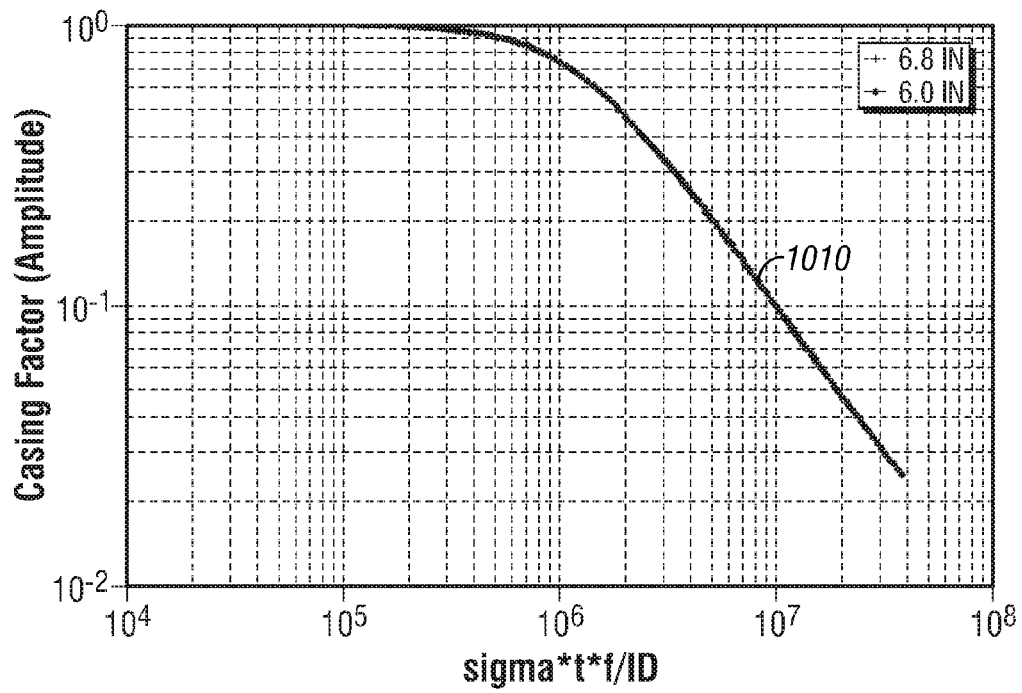
FIGS. 10a and 10b are plots showing the relationship between casing factors and sigma*t*f/ID, for two different casing inner diameters.
Figure 10B:
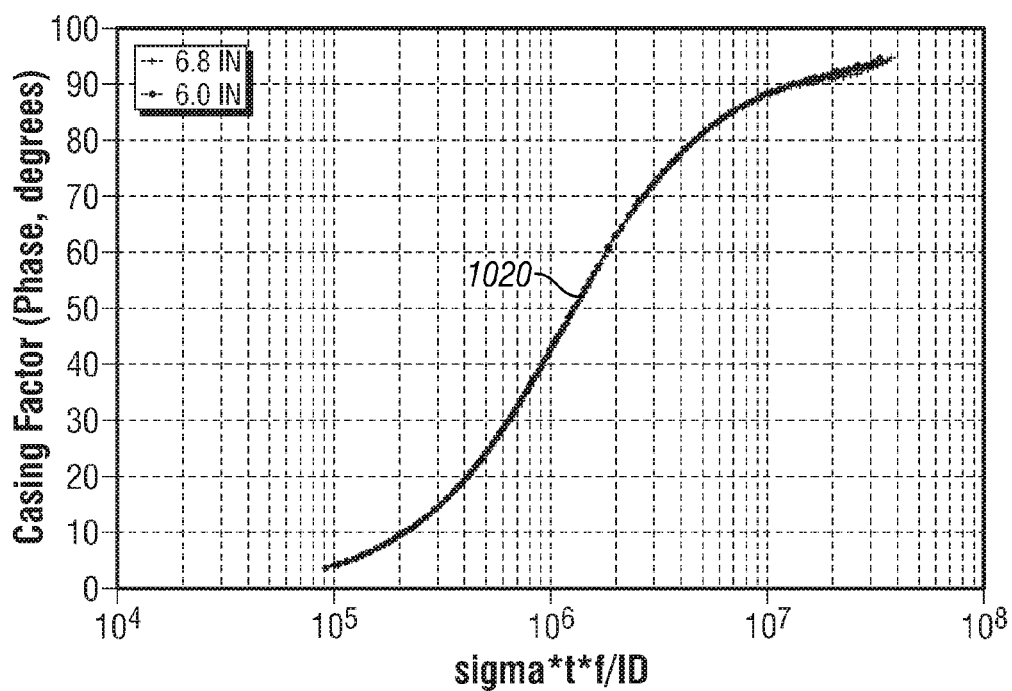

FIGS. 10a and 10b are plots showing the relationship between casing factors and sigma*t*f/ID, for two different casing inner diameters, 6.0 in and 6.8 in. In particular, curve 1010 in FIG. 10a shows the relationship between the casing factor amplitude and sigma*t*f/ID, and curve 1020 in FIG. 10b shows the relationship between the casing factor phase and sigma*t*f/ID. It is apparent in FIGS. 10a-b that the relationship between casing factor and sigma*t*f/ID does not change with small variations of casing inner diameter.

Figure 11A:
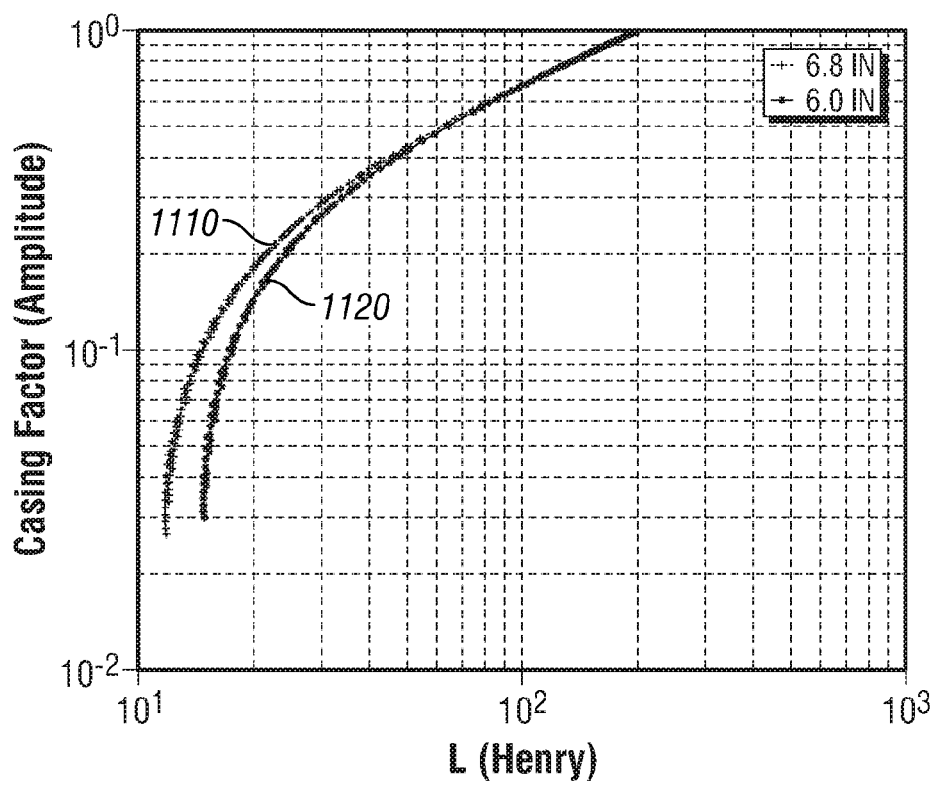
FIGS. 11a-11d are plots showing the relationship for casing attenuation factor versus L and R/f for two different casing inner diameters.
Figure 11B:
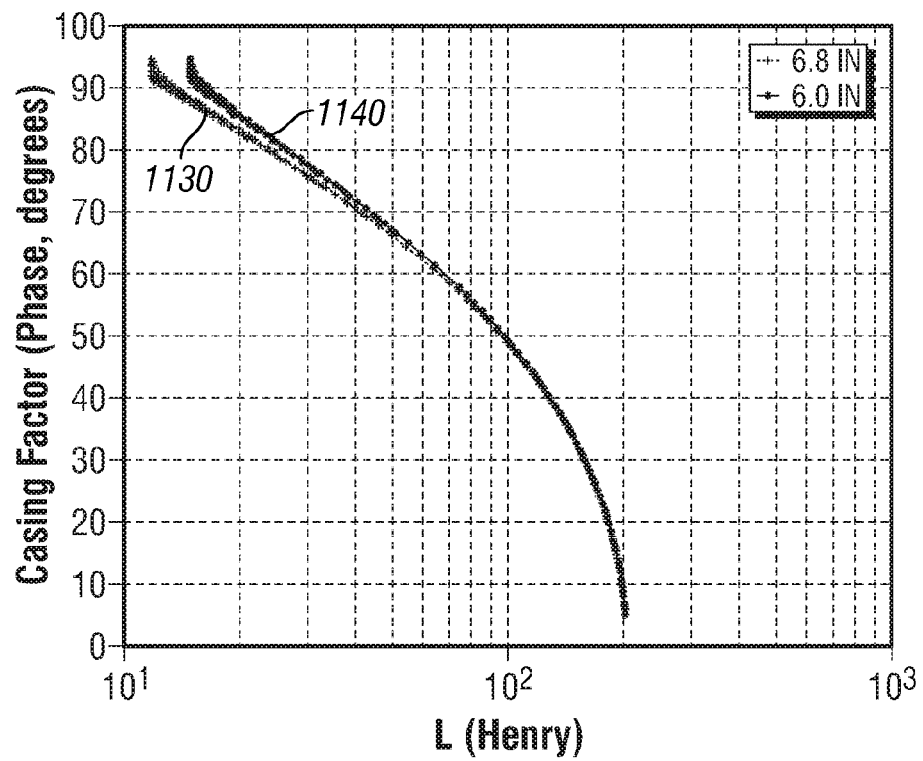
Figure 11C:
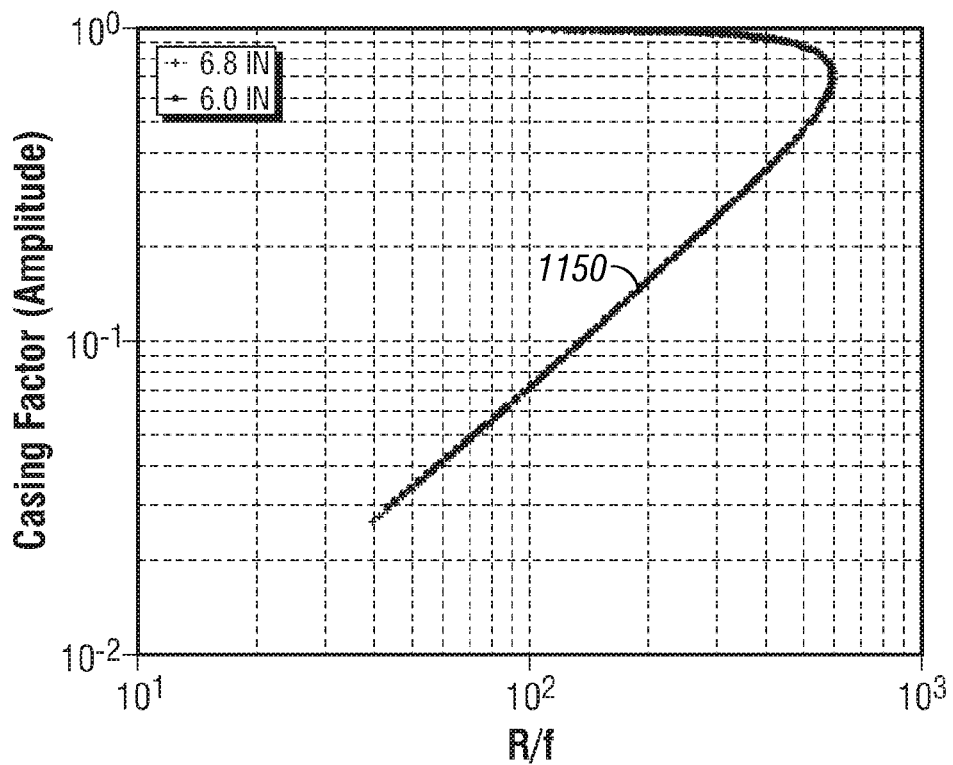
Figure 11D:
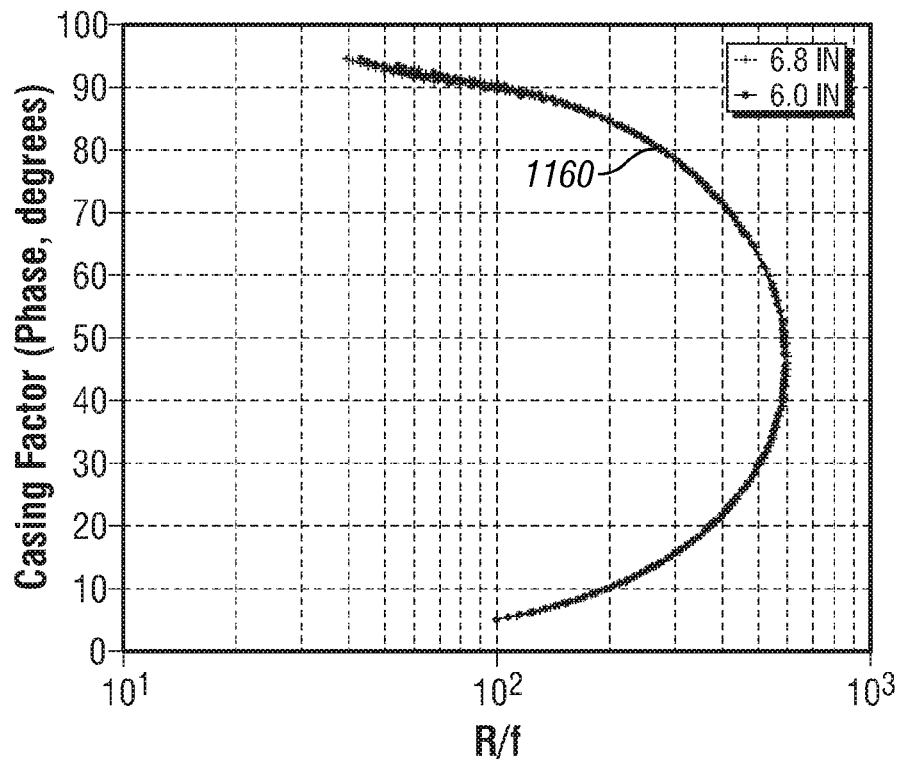

FIGS. 11a-11d are plots showing the relationship for casing attenuation factor versus L and R/f for two different casing inner diameters. In particular, curves 1110 and 1120 in FIG. 11a show the casing attenuation factor amplitude versus L for casing inner diameters 6.0 inches and 6.8 inches respectively. Curves 1130 and 1140 in FIG. 11b show the casing attenuation factor phase versus L for casing inner diameters 6.0 inches and 6.8 inches respectively. Curve 1150 in FIG. 11c shows the casing attenuation factor amplitude versus R/f for both casing inner diameters 6.0 inches and 6.8 inches. Curve 1160 in FIG. 11d shows the relationship between casing attenuation factor phase versus R/f for both casing inner diameters 6.0 inches and 6.8 inches. Notice that the relationship between the casing factor and R/f changes very little with changes of casing inner diameter, while the relation between casing factor and L does change a lot with changes of casing inner diameter.

In cases where the casing inner diameter exhibits variations:
(1) If the casing is connected with several casing segments with known inner diameter, the known inner diameter method described above can be used segment by segment.
(2) FIGS. 11a and 11b can be used to determine casing attenuation factor directly from the measurement of R/f for the same frequency. L should not be used for this purpose.
(3) FIGS. 9a and 9b can be used to determine sigma*t*f/ID from the measurement of R/f and/or L. Then sigma*t*f/ID is scaled to the sigma*t*f/ID of the frequency of interest. Finally, FIGS. 10a and 10b can be used to determine the casing attenuation factor.

Thus, according to various embodiments, using the described techniques and relationships, the attenuation seen by a distant receiver at any frequency can be obtained directly from single frequency measurements of the impedance of the transmitter in non-magnetic/chromium casing. The described techniques and relationships can also be used to predict the attenuation to be experienced by a cased receiver to the fields produced by a distant transmitter. Thus, it is possible to perform the prediction irrespective of the casing conductivity, casing thickness, small casing inner diameter variations, and formation conductivity distribution. Two different methods are described depending on whether the casing inner diameter exhibits variations. It has been found that both impedance (R/f, L) and casing attenuation factors are simple functions of sigma*t*f, and these have been confirmed by both simulation and lab measurements.

Although the relationships described above are based on a fixed inner diameter of the casing, similar relationships apply for fixed outer diameter (OD), including R/f vs sigma*t*f, L vs sigma*t*f, casing factor versus sigma*t*f, R/f versus sigma*t*f/OD, L versus sigma*t*f/OD, casing factor versus sigma*t*f/OD, casing factor versus R/f and casing factor versus L.

The methods in this invention can be used to estimate the product of sigma*t of the casing from impedance measurements. Moreover, if sigma or t can be determined from other resources, t or sigma can be determined from the determined sigma*t product.

According to some embodiments, the described methods are also used to determine the casing correction for an auxiliary receiver adjacent to a transmitter, both in the same casing but separated by a sufficient distance (on the order of 7 to 10 meters). The corrected field measured at this receiver is then a measure of the effective moment of the transmitter, and is the same effective moment that is used to predict the field at a distant receiver site. In this mode a transmitter correction is obtained in casing, and even in a non-linear operating range of the transmitter.

In general, the accuracy of the predictions depends on the accuracy of impedance measurements.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for making an electromagnetic induction survey of a formation surrounding a borehole having a casing comprising:
deploying an electromagnetic transducer into a section of the borehole that is cased with a conductive non-magnetic casing having non-constant casing properties along the length of the casing;
making impedance measurements relating to impedance of the electromagnetic transducer at a first frequency while deployed in the section of the borehole;
making electromagnetic survey measurements of the formation; and
compensating for varying attenuation in the electromagnetic survey measurements due to having non-constant casing properties of the conductive non-magnetic casing, the compensation being based at least in part on a relationship between a varying casing correction factor and a product of parameters relating to casing conductivity, casing thickness and electromagnetic frequency, the compensation being further based in part on a relationship between one or more impedance parameters and the product of parameters relating to casing conductivity, casing thickness and electromagnetic frequency, the product of parameters relating to casing conductivity and casing thickness being estimated based on the one or more impedance parameters, wherein either the parameter relating to casing conductivity or the parameter relating to casing thickness being independently measured and the other of the two parameters is determined based on the estimated product of the two parameters.

2. A method according to claim 1 wherein the relationship is predetermined.

3. A method according to claim 2 wherein the predetermined relationship is one of 1) maintained in a lookup table and 2) maintained as a formula.

4. A method according to claim 1 wherein the one or more impedance parameters is selected from the group consisting of inductance, and resistance divided by electromagnetic frequency.

5. A method according to claim 1 wherein the formation measurements detect formation properties more than 1 meter from the borehole.

6. A method according to claim 1 wherein at least some of the electromagnetic survey measurements are made at the first frequency.

7. A method according to claim 1 wherein at least some of the electromagnetic survey measurements are made at one or more second frequencies other than the first frequency, and the compensation for the second frequencies are scaled using a ratio of the second frequencies and the first frequency.

8. A method according to claim 1 wherein the relationship is between the casing correction factor and the product of parameters relating to casing conductivity, casing thickness and electromagnetic frequency divided by a parameter relating to the diameter of the casing in the section of the borehole.

9. A method according to claim 6 wherein the parameter relating to the diameter of the casing is selected from the group consisting of casing inner diameter and casing outer diameter.

10. A method according to claim 1 wherein the conductive non-magnetic cased section of the borehole is cased with non-magnetic chromium steel.

11. A method according to claim 1 further comprising deploying a second electromagnetic transducer into a section of a second borehole, wherein the electromagnetic survey measurements are made by transmitting and receiving between the boreholes using the transducers.

12. A method according to claim 1 further comprising a deploying a second electromagnetic transducer on the surface, wherein the electromagnetic survey measurements are made by transmitting and receiving between surface and the borehole using the transducers.

13. A method for making an electromagnetic induction survey of a formation surrounding a borehole having a casing comprising:
    deploying an electromagnetic transducer into a section of the borehole that is cased with a conductive non-magnetic casing having non-constant casing properties along the length of the casing;
    making impedance measurements relating to impedance of the electromagnetic transducer at a first frequency while deployed in the section of the borehole;
    making electromagnetic survey measurements of the formation; and
    compensating for varying attenuation in the electromagnetic survey measurements due to having non-constant casing properties of the conductive non-magnetic casing, the compensation being based upon a relationship between one or more impedance parameters and a product of parameters relating to casing conductivity and casing thickness, the product of parameters relating to casing conductivity and casing thickness being estimated based on the one or more impedance parameters, wherein either the relating casing conductivity or the parameter relating to casing thickness being independently measured and the other of the two parameters is determined based on the estimated product of the two parameters.

14. A method according to claim 13 wherein the relationship is predetermined.

15. A method according to claim 13 wherein the relationship is 1) in a lookup table or 2) maintained as a formula.

16. A method according to claim 13 wherein the compensating is further based upon in part from a relationship between a casing correction factor and a product of parameters relating to casing conductivity, casing thickness and electromagnetic frequency.

17. A method according to claim 13 wherein at least some of the electromagnetic survey measurements are made at the first frequency.

18. A method according to claim 13 wherein the conductive non-magnetic cased section of the borehole is cased with non-magnetic chromium steel.

19. A method according to claim 13 further comprising deploying a second electromagnetic transducer into a section of a second borehole, wherein the electromagnetic survey measurements are made by transmitting and receiving between the boreholes using the transducers.

20. A method according to claim 13 wherein the one or more parameters relating to impedance is selected from the group consisting of inductance, and resistance divided by electromagnetic frequency.

21. A system for making electromagnetic induction measurements of a formation surrounding a borehole having a casing comprising:
    an electromagnetic transducer deployable into a section of the borehole that is cased with a conductive non-magnetic casing having non-constant casing properties along the length of the casing, such that the induction measurements and impedance measurements of the transducer can be made at a plurality of depths; and
    a processing system configured and arranged to generate electromagnetic survey data for the formation, the survey data being compensated for varying attenuation of the non-constant casing properties along the length of the casing, wherein the compensation is based at least in part on a relationship between a varying casing correction factor and a product of parameters relating to casing conductivity, casing thickness and electromagnetic frequency, the survey data being further compensated based in part on a relationship between one or more impedance parameters and the product of parameters relating to casing conductivity, casing thickness and electromagnetic frequency, the product of parameters relating to casing conductivity and casing thickness being estimated based on the one or more impedance parameters, wherein either the parameter relating to casing conductivity or the parameter relating to casing thickness being independently measured and the other of the two parameters is determined based on the estimated product of the two parameters.

22. A system according to claim 21 wherein the relationship is predetermined and is maintained in a lookup table.

23. A system according to claim 21 wherein the relationship is predetermined and is maintained as a formula.

24. A system according to claim 21 wherein the casing correction factor is scaled using a ratio of a first frequency used for the impedance measurements and second frequencies used for the induction measurements.

25. A system according to claim 21 wherein the relationship is between the casing correction factor and the product of parameters relating to casing conductivity, casing thickness and the first frequency divided by a parameter relating to the diameter of the casing in the section of the borehole.

26. A system according to claim 21 wherein the conductive non-magnetic cased section of the borehole is cased with non-magnetic chromium steel.

27. A system according to claim 21 further comprising a second electromagnetic transducer deployable into a section of a second borehole, wherein the electromagnetic induction measurements are made by transmitting and receiving between the boreholes using the transducers.

28. A system according to claim 21 further comprising a second electromagnetic transducer deployable on the surface, wherein the electromagnetic induction measurements are made by transmitting and receiving between surface and the borehole using the transducers.

29. A method of compensating for attenuation in electromagnetic induction survey measurements due to a conductive non-magnetic casing, the method comprising:
receiving electromagnetic measurement data representing measurements properties of a formation surrounding a borehole having a conductive non-magnetic casing having non-constant casing properties along the length of the casing, the measurements made using a electromagnetic transducer;
receiving impedance measurements relating to impedance the electromagnetic transducer while deployed in the borehole; and
compensating for varying attenuation in the electromagnetic measurement data due to the non-constant casing properties along the length of the casing, the compensation being based upon a relationship between one or more impedance parameters and a product of parameters relating to casing conductivity and casing thickness, the product of parameters relating to casing conductivity and casing thickness being estimated based on the one or more impedance parameters, wherein either the parameter relating to casing conductivity or the parameter relating to casing thickness being independently measured and the other of the two parameters is determined based on the estimated product of the two parameters.

30. A method according to claim 29 wherein the relationship is predetermined.

31. A method according to claim 29 wherein the relationship is also derived in part from a relationship between a casing correction factor and a product of parameters relating to casing conductivity, casing thickness and electromagnetic frequency.

32. A method according to claim 29 wherein the conductive non-magnetic casing is made from non-magnetic chromium steel.

* * * * *